United States Patent [19]

English

[11] 4,131,812
[45] Dec. 26, 1978

[54] ATTACHMENT OF SIDE COVERS TO LINEAR INDUCTION MOTOR

[75] Inventor: Christopher D. English, Toronto, Canada

[73] Assignee: Spar Aerospace Producs Ltd., Toronto, Canada

[21] Appl. No.: 805,767

[22] Filed: Jun. 13, 1977

[51] Int. Cl.² ............................................. H02K 41/02
[52] U.S. Cl. ...................................................... 310/13
[58] Field of Search .................................. 310/12–14; 104/148, 148 LM, 148 MS

[56] References Cited

U.S. PATENT DOCUMENTS

| 3,668,444 | 6/1972 | Davey | 310/13 |
| 3,911,828 | 10/1975 | Schwaraler | 310/13 X |

Primary Examiner—Donovan F. Duggan
Attorney, Agent, or Firm—Fetherstonhaugh & Co.

[57] ABSTRACT

In a primary member of a single-sided linear induction motor having, a frame, a core member having a plurality of coil assemblies mounted in the coil slots thereof and secured therein by means of a plurality of wedge members, each of the wedge members having an upper face directed towards a coil assembly and a lower face disposed below the core member, the coil assemblies having nose portions projecting laterally from opposite sides of the core member, a pair of side covers adapted to extend over the nose portions of the coils, each side cover member having inner and outer longitudinally extending side edges, the outer side edge of each side cover member being secured to the frame outwardly from the coil noses on opposite sides of the core a substantial distance above the lower face of the wedge members, the improvement of; a plurality of cover mounting brackets located at longitudinally spaced intervals along the length of said core, each of said cover mounting brackets comprising a main body portion and a head portion at one end of the main body portion, the head portion projecting laterally from the main body portion, the other end of the main body portion being located within a coil slot of the core and secured therein between a wedge member and a coil assembly with the head portion thereof disposed above the lower face of the wedge member and spaced below the lower face of its associated coil, the inner edges of each of said side covers being downwardly curved and notched at longitudinally spaced intervals corresponding to the longitudinal spacing of the mounting brackets so as to extend inwardly and downwardly over the laterally extending head portions of the mounting brackets on opposite sides of the main body portions to be supported by the head portion in a plane above the plane of the lower face of the wedge members.

2 Claims, 5 Drawing Figures

ATTACHMENT OF SIDE COVERS TO LINEAR INDUCTION MOTOR

FIELD OF INVENTION

This invention relates to linear induction motors. In particular, this invention relates to improvements in the mounting structure for mounting the side covers of the primary member of a single-sided linear induction motor.

PRIOR ART

In order to protect the nose portions of the coils which project outwardly from opposite sides of the core of the primary ary member of a linear induction motor, side covers are provided. Considerable difficulty has been encountered in attempting to mount the side covers in a manner such that they are maintained in a plane above the plane of the lower faces of the wedge members of the core. It is important to ensure that the covers do not project below the plane of the lower surfaces of the wedge members in order to avoid a situation wherein the side covers may make contact with the secondary member of the induction motor in association with which the primary member is used. From time to time the lowermost surface of the primary member may accidentally come in contact with the uppermost face of the secondary member and if the side covers project below the lowermost face of the primary member, the side covers may damage the secondary member over a substantial length of the secondary member. For this reason it is important to ensure that the lower surfaces of the wedge members form the lowermost surface of the primary member.

SUMMARY OF INVENTION

The present invention overcomes the difficulty of mounting the side covers by providing small mounting brackets at spaced intervals along the length of the oppositely disposed side edges of the core member to support the inner edges of the side covers in a plane above the plane of the lower surface of the wedge members.

According to one aspect of the present invention, there is provided in a primary member of a single-sided linear induction motor having, a frame, a core member having a plurality of coil assemblies mounted in the coil slots thereof and secured therein by means of a plurality of wedge members, each of the wedge members having an upper face directed towards a coil assembly and a lower face disposed below the core member, the coil assemblies having nose portions projecting laterally from opposite sides of the core member, a pair of side covers adapted to extend over the nose portions of the coils, each side cover member having inner and outer longitudinally extending side edges, the outer side edge of each side cover member being secured to the frame outwardly from the coil noses on opposite sides of the core a substantial distance above the lower face of the wedge members, the improvement of; a plurality of cover mounting brackets located at longitudinally spaced intervals along the length of said core, each of said cover mounting brackets comprising a main body portion and a head portion at one end of the main body portion, the head portion projecting laterally from the main body portion, the other end of the main body portion being supported by a wedge member with the head portion thereof disposed above the lower face of the wedge member and spaced below the lower face of its associated coil, the inner edges of each of said side covers being downwardly curved and notched at longitudinally spaced intervals corresponding to the longitudinal spacing of the mounting brackets so as to extend inwardly and downwardly over the laterally extending head portions of the mounting brackets on opposite sides of the main body portions to be supported by the head portion in a plane above the plane of the lower face of the wedge members.

The invention will be more clearly understood after reference to the following detailed specification read in conjunction with the drawings, wherein FIG. 1 is a pictorial view of the underside of a primary member of a single-sided linear induction motor;

Figure 1:
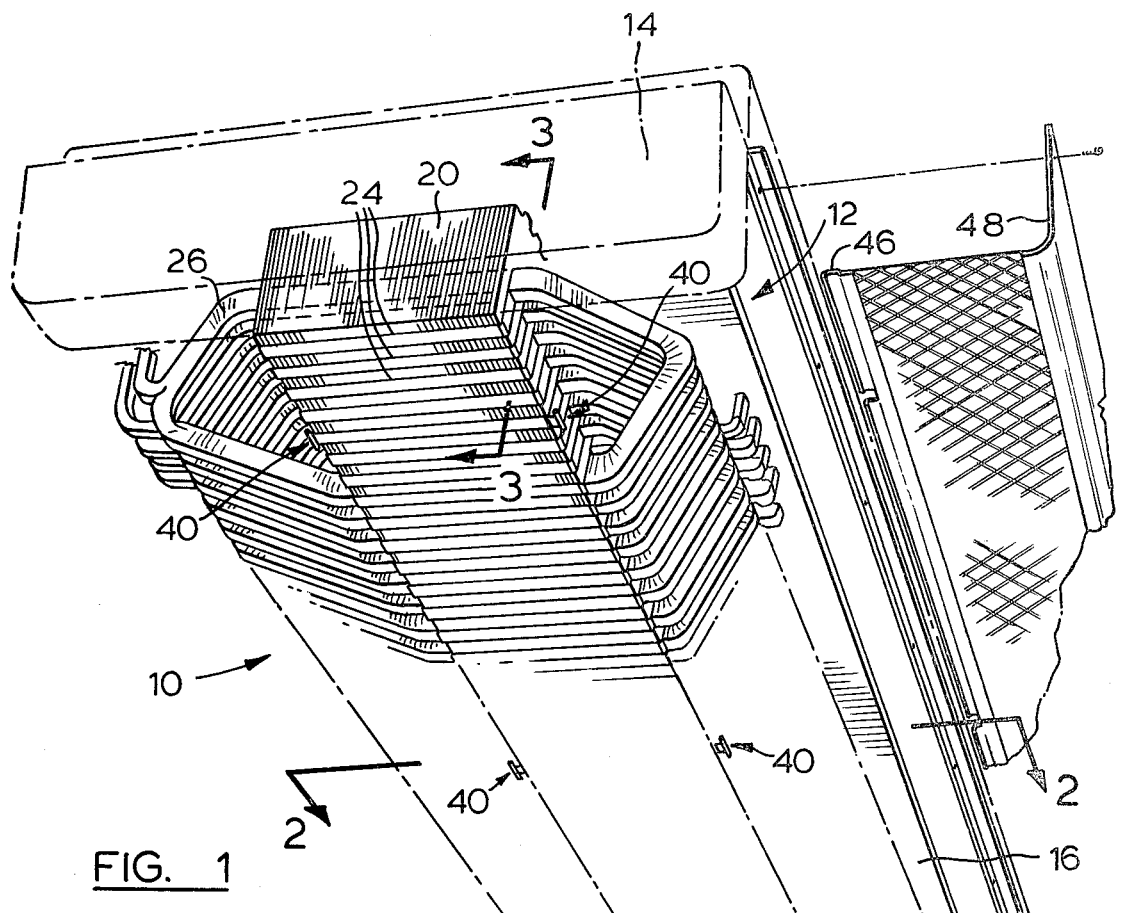

With reference to FIG. 1 of the drawings, the reference numeral 10 refers generally to a primary member of a single-sided linear induction motor. The motor has a frame generally identified by the reference numeral 12. The frame includes a pair of oppositely disposed end wall members 14 between which a pair of longitudinally extending L-shaped beams 16 (FIG. 2) extend. A second pair of L-shaped brackets 18 extend longitudinally of the side edges of the frame and are located at opposite sides of the frame a substantial distance above the lower surface of the core 20. The core 20 is mounted between the beams 16 by a plurality of bolts 22 which are located at longitudinally spaced intervals along the length of the core. The core 20 is formed with a plurality of coil mounting slots 24 extending transversely thereof. A plurality of coils 26 are mounted in the core slots 24. As shown in FIG. 3 of the drawings, two coil members are arranged one on top of the other in the majority of the slots 24 and a spacer member 28 is located in the slots 24 which do not house two coil members. The coil assembly which is located within each slot 24 may, therefore, consist of two side lengths of coil arranged one above the other or one side length of coil and a spacer 28.

A pair of grooves 30 are formed in the oppositely disposed side walls of the slots 24 adjacent the lower end thereof.

A wedge member 32 (FIG. 4) is adapted to fit in a close fitting relationship within the lower end of each slot 24 and is provided with a pair of oppositely disposed shoulders 34 which fit within the grooves 30 formed in the side walls of the slot 24. The wedge members 32 are preferably made from an insulating material such as a plastic material. A shallow groove 36 is formed in the upper face of selected wedge members 32a and extends inwardly from opposite ends thereof.

Figure 4:
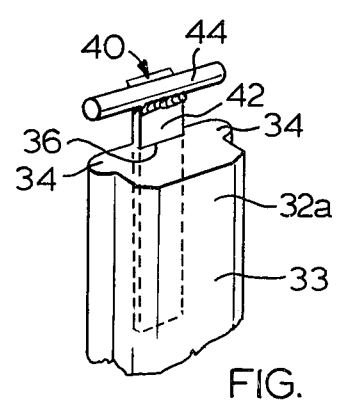
FIG. 4 is an enlarged detailed view of a mounting bracket according to an embodiment of the present invention.
Figure 5:
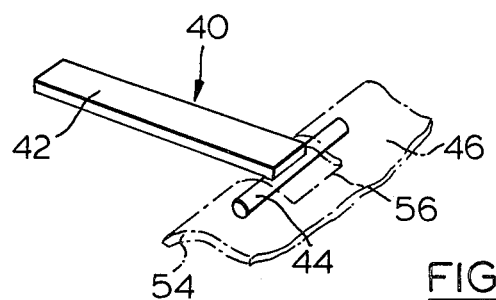
FIG. 5 is an enlarged detailed view illustrating the manner in which the inner edge of the side covers is supported on the mounting bracket.

A mounting bracket generally identified by the reference numeral 40 is located in each of the grooves 36. As shown in FIG. 1 of the drawings, six mounting brackets are provided, three on either side of the core 20. As shown in FIGS. 4 and 5 of the drawings, each of the mounting brackets 40 consists of a main body portion 42 and a head portion 44. The main body portion 42 is proportioned to fit in a close fitting relationship within the recess 36 formed in the upper surface of the wedge member 32a. The head portion 44 extends transversely of and projects laterally outwardly from opposite sides of the main portion to form a support for the inner edge 46 of the side cover members 48.

Figure 2:
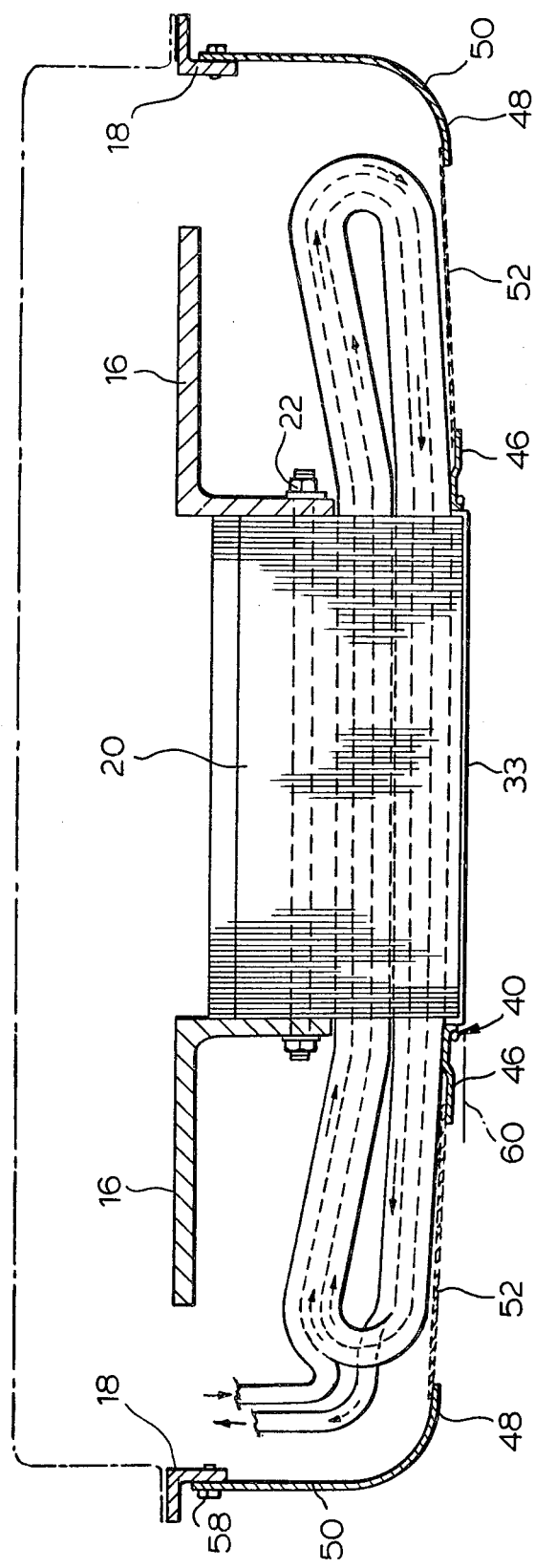
FIG. 2 is a sectional view along the line 2—2 of FIG. 1.
Figure 3:
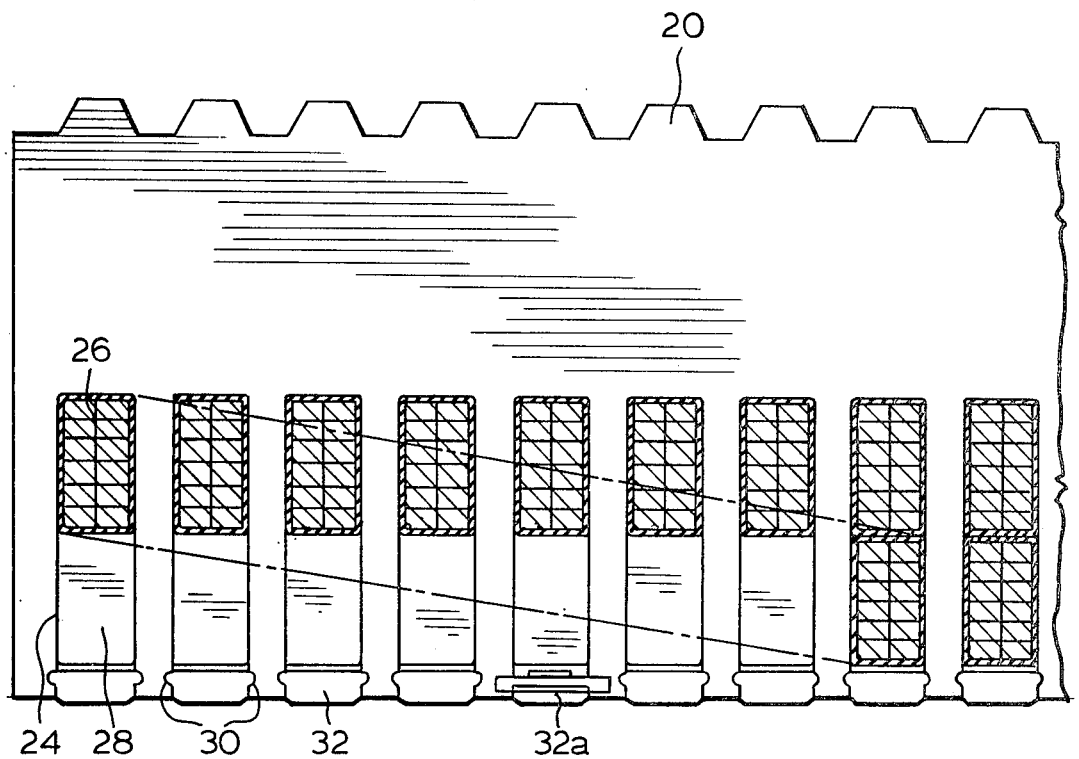
FIG. 3 is a sectional view along the line 3—3 of FIG. 1.

As shown in FIGS. 1 and 2 of the drawings, each of the side covers 48 has an inner edge panel 46 and an outer edge panel 50 which are connected to one another by a screen member 52. The inner edge member 46 is formed with a plurality of notches 56 and the portions of the inner edge member disposed on either side of the notches 56 has a shallow downward curvature so as to extend over the laterally projecting portions of the head 44 of the mounting brackets 40.

The outer side edges of the covers are secured by a plurality of bolts 58 to the L-shaped frame members 18 and opposite ends of the covers extend around the lips 45 which are formed on the inner face of each end wall member 14.

The main body portions 42 of the mounting brackets 40 are located within the coil slots 24 between the wedge members 32a and the underside of the coil assemblies. The head portion 44 projects outwardly from the end of the wedge member 32a a distance sufficient to enable the curved inner edge 46 of the side wall cover 48 to extend inwardly and downwardly over the head portion 44 to rest thereon. As shown in FIG. 2 of the drawings, the mounting bracket 40 serves to maintain the lower surface of the side covers above the plane 60 of the lower surface 33 of the wedge 32a. This arrangement ensures that if the primary member is accidentally lowered into engagement with the secondary member, the lower surfaces 33 of the wedge members 32 will provide the first contact surface and will serve to space the side covers a sufficient distance above the secondary member to ensure that the secondary member is not damaged by contact with the side covers or vice versa.

These and other advantages of the present invention will be apparent to those skilled in the art.

What I claim as my invention is:

1. In a primary member of a single-sided linear induction motor having, a frame, a core member having a plurality of coil assemblies mounted in the coil slots thereof and secured therein by means of a plurality of wedge members, each of the wedge members having an upper face directed towards a coil assembly and a lower face disposed below the core member, the coil assemblies having nose portions projecting laterally from opposite sides of the core member, a pair of side covers adapted to extend over the nose portions of the coils, each side cover member having inner and outer longitudinally extending side edges, the outer side edge of each side cover member being secured to the frame outwardly from the coil noses on opposite sides of the core a substantial distance above the lower face of the wedge members, the improvement of; a plurality of cover mounting brackets located at longitudinally spaced intervals along the length of said core, each of said cover mounting brackets comprising a main body portion and a head portion at one end of the main body portion, the head portion projecting laterally from the main body portion, the other end of the main body portion being located within a coil slot of the core and secured therein between a wedge member and a coil assembly with the head portion thereof disposed above the lower face of the wedge member and spaced below the lower face of its associated coil, the inner edges of each of said side covers being downwardly curved and notched at longitudinally spaced intervals corresponding to the longitudinal spacing of the mounting brackets so as to extend inwardly and downwardly over the laterally extending head portions of the mounting brackets on opposite sides of the main body portions to be supported by the head portion in a plane above the plane of the lower face of the wedge members.

2. In a primary member of a single-sided linear induction motor having, a frame, a core member having a plurality of coil assemblies mounted in the coil slots thereof and secured therein by means of a plurality of wedge members, each of the wedge members having an upper face directed towards a coil assembly and a lower face disposed below the core member, the coil assemblies having nose portions projecting laterally from opposite sides of the core member, a pair of side covers adapted to extend over the nose portions of the coils, each side cover member having inner and outer longitudinally extending side edges, the outer side edge of each side cover member being secured to the frame outwardly from the coil noses on opposite sides of the core a substantial distance above the lower face of the wedge members, the improvement of; a plurality of cover mounting brackets located at longitudinally spaced intervals along the length of said core, each of said cover mounting brackets comprising a main body portion and heat portion at one end of the main body portion, the heat portion projecting laterally from the main body portion, the other end of the main body portion being supported by a wedge member with the head portion thereof disposed above the lower face of the wedge member and spaced below the lower face of its associated coil, the inner edges of each of said side covers being downwardly curved and notched at longitudinally spaced intervals corresponding to the longitudinal spacing of the mounting brackets so as to extend inwardly and downwardly over the laterally extending head portions of the mounting brackets on opposite sides of the main body portions to be supported by the head portion in a plane above the plane of the lower face of the wedge member.

* * * * *